(12) United States Patent
Kawahara et al.

(10) Patent No.: US 6,413,451 B1
(45) Date of Patent: Jul. 2, 2002

(54) METHOD FOR SPHERIZING GRANULAR POLYETRAFLUOROETHYLENE POWDER

(75) Inventors: Kazuya Kawahara; Michio Asano, both of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/509,875

(22) PCT Filed: Sep. 29, 1998

(86) PCT No.: PCT/JP98/04355

§ 371 (c)(1),
(2), (4) Date: Apr. 3, 2000

(87) PCT Pub. No.: WO99/18146

PCT Pub. Date: Apr. 15, 1999

(30) Foreign Application Priority Data

Oct. 3, 1997 (JP) .............................................. 9-271634

(51) Int. Cl.[7] .............................................. B29C 67/00
(52) U.S. Cl. .......................... 264/15; 264/117; 264/340
(58) Field of Search ............................. 264/340, 15, 117

(56) References Cited

U.S. PATENT DOCUMENTS 5,409,805 A * 4/1995 Haraguchi et al. .......... 430/372
5,772,930 A * 6/1998 Hashimoto et al. ......... 264/117

FOREIGN PATENT DOCUMENTS

JP 43-8611 4/1943
JP 50-84649 7/1975

OTHER PUBLICATIONS

Chemical Engineers' Handbook, Fourth Edition, pp. 8–60–8–61.

* cited by examiner

*Primary Examiner*—Mary Lynn Theisen
(74) *Attorney, Agent, or Firm*—Armstrong, Westerman & Hattori, LLP (57) ABSTRACT

To provide a method of shaping a granular polytetrafluoroethylene powder, in which a powder flowability can be enhanced and an apparent density can be increased without substantially changing an average particle size and particle size distribution of the powder. The granular polytetrafluoroethylene powder having an average particle size of 100 to 800 μm is subjected to shaping by using a rotating-type stirring vessel with two cross axes.

17 Claims, 4 Drawing Sheets

METHOD FOR SPHERIZING GRANULAR POLYETRAFLUOROETHYLENE POWDER

TECHNICAL FIELD

The present invention relates to a method of shaping a granular polytetrafluoroethylene (PTFE) powder.

BACKGROUND ART

PTFE, particularly PTFE prepared by suspension polymerization is once pulverized into an average particle size of not more than about 100 μm, and then granulated by various granulation methods such as dry granulation and wet granulation to be a granular powder having an average particle size of from about 100 μm to about 800 μm. The granular powder is used as it is as a molding powder for powder molding. However even if the powder is simply granulated, the granulated powder is poor in powder flowability, and therefore usually after the granulation step, a shaping step is provided for shaping of the granulated powder, thereby enhancing a powder flowability and increasing an apparent density.

For example, a granular PTFE powder obtained by granulating with a ribbon mixer and then with a flash mixer is again treated with a ribbon mixer for shaping at a decreased number of rotations.

In that shaping method with a ribbon mixer, though an apparent density and powder flowability of a granular PTFE powder after the shaping are enhanced, there are problems that granular powders are agglomerated and particles having a large particle size are obtained, which results in shifting to a larger average particle size and increase of a larger particle size region in particle size distribution.

Those problems also arise in case where granular PTFE powders obtained by other granulation methods are subjected to shaping with a ribbon mixer.

An object of the present invention is to provide a method of shaping a granular PTFE powder, which enhances an apparent density and powder flowability without substantially changing an average particle size and a particle size distribution.

DISCLOSURE OF THE INVENTION

The present invention relates to the method of shaping of a granular PTFE powder, characterized in that a granular PTFE powder granulated to an average particle size of from 100 to 800 μm is put in a stirring vessel having two or more rotation axes crossing each other and is subjected to stirring for shaping by rotating the stirring vessel on its rotation axes.

The stirring is carried out under the conditions for increasing an apparent density of the granular PTFE powder without substantially changing its average particle size and particle size distribution.

It is preferable that two or more rotation axes of the stirring vessel are disposed at a right angle to each other. A represented preferable example thereof is a cross rotary mixer.

With respect to the stirring conditions of the cross rotary mixer, it is preferable that a speed of revolution is from 5 to 20 rpm and a speed of autorotation is from 10 to 30 rpm.

A granular PTFE powder to be subjected to shaping may be deagglomerated before the shaping.

As a granular PTFE powder to be subjected to shaping, a granular powder granulated by a dry granulation method or other granulation method can be used.

A granular PTFE powder to be subjected to shaping may contain or does not contain a filler.

BEST MODE FOR CARRYING OUT THE INVENTION

A feature of the present invention is to use a stirring vessel having two or more axes, particularly two cross axes for shaping (hereinafter referred to as "rotating-type stirring vessel with two cross axes"). When the rotating-type stirring vessel with two cross axes is used, since the granular PTFE powder becomes round without being agglomerated, an apparent density can be increased and a powder flowability can be enhanced without changing an average particle size and a particle size distribution.

The shaping method of the present invention is a method for putting a granular PTFE powder obtained by various granulation methods into a rotating-type stirring vessel with two cross axes and then stirring the powder by rotating the stirring vessel on each of the two rotation axes for a given period of time.

An example of a rotating-type stirring vessel with two cross axes which can be suitably used in the present invention is a cross rotary mixer which has been used for mixing of various powders. The cross rotary mixer is usually used for mixing of metals, ceramics, chemicals, cosmetics, foods, etc. from a sanitary point of view and from the viewpoint of its mixing performances.

Known types of cross rotary mixers are as follows.
(1) Cross rotary mixer with a high speed stirring chopper
(2) Cross rotary mixer with a baffle plate
(3) Cross rotary mixer with a binder injection nozzle Any of those mixers can be used in the present invention.

Figure 1:
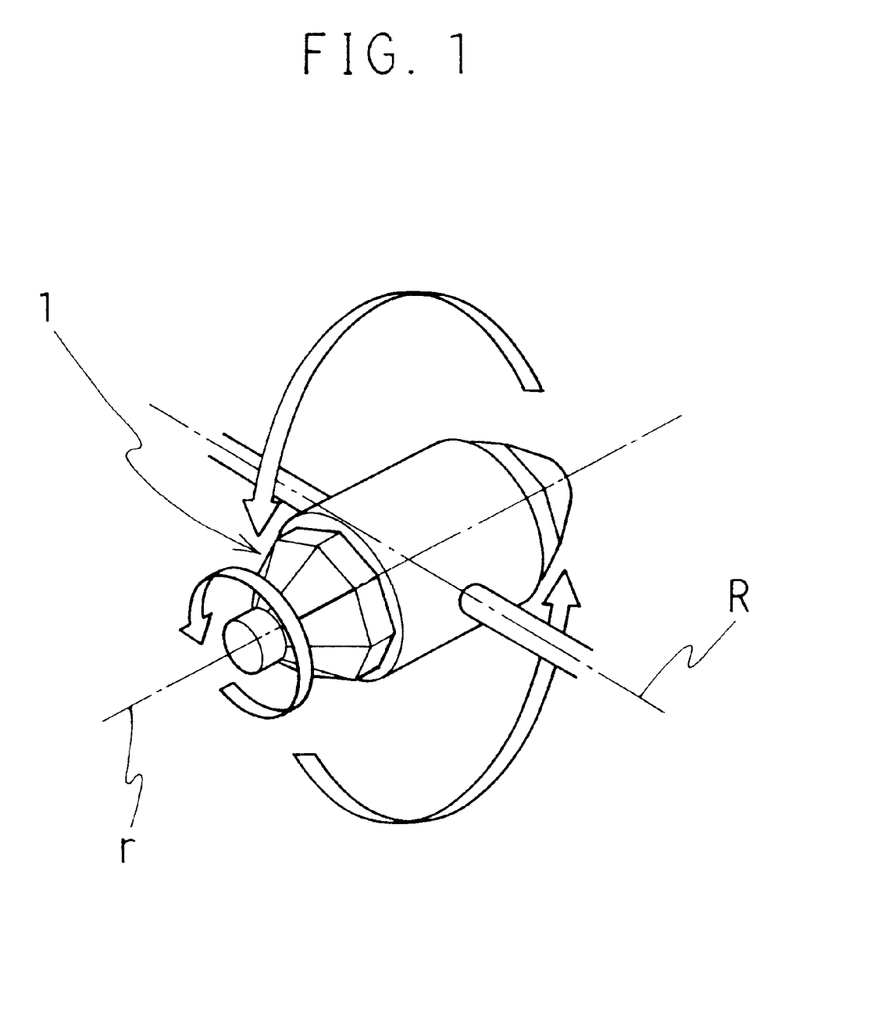
FIG. 1 is a partial perspective view of a cross rotary mixer used in the present invention for explaining directions of autorotation and revolution.

In the cross rotary mixer used in the present invention, as shown in FIG. 1, the autorotation means the rotation of the stirring vessel 1 on the axis r, and the revolution means the rotation on the axis R.

With respect to the relation between the speed of autorotation and the speed of revolution of the cross rotary mixer, when the speed of autorotation is assumed to be 1, it is preferable, but indefinite, to adjust the speed of revolution (referred to as "a ratio of revolution/autorotation") to 0.1 to 2 from the point that an apparent density can be increased more and a powder flowability can be enhanced more without changing an average particle size and particle size distribution.

A stirring time varies depending on a desired particle size and is optionally selected experimentally. In general with the advance of stirring, an apparent density increases but the increase in apparent density reaches its upper limit in a certain period of time. The stirring time is usually from about 5 minutes to about 30 minutes.

The stirring with the cross rotary mixer is carried out under the conditions of 5 to 60 rpm of autorotation speed, 5 to 40 rpm of revolution speed, 0.3 to 1 of a ratio of revolution/autorotation and 5 to 30 minutes of stirring time. Under those conditions, a granular PTFE powder subjected to shaping and being excellent particularly in an apparent density and powder flowability can be obtained without changing an average particle size and particle size distribution. Further preferred conditions are 10 to 30 rpm of autorotation speed, 5 to 20 rpm of revolution speed, 0.5 to 0.8 of a ratio of revolution/autorotation and 5 to 30 minutes of stirring time. Under such conditions, a granular PTFE powder subjected to shaping and being further excellent in an apparent density and powder flowability can be obtained.

From the point that shaping of a granular powder is carried out preferably with heating, it is preferable to maintain the stirring vessel at a temperature of from about 40° C. to about 80° C., usually from about 40° C. to about 70° C. by a method of recirculating hot water or the like method.

With respect to granular PTFE powders which can be used for the method of shaping of the present invention, a granulation method is not limited. Granular PTFE powders prepared by various granulation methods can be used. Also not only a filler-containing granular PTFE powder but also a non-filler-containing granular PTFE powder can be subjected to the shaping of the present invention.

In general, a non-filler-containing granular PTFE powder after the granulation has an average partial size of 100 to 800 $\mu$m and an apparent density of 0.4 to 0.6 g/cc. When such a granular PTFE powder is subjected to the shaping of the present invention, its average particle size and particle size distribution do no change substantially, and its apparent density increases to 0.7 to 1.0 g/cc and its powder flowability is enhanced. Also in case of a filler-containing granular PTFE powder, its average particle size and particle size distribution are the same as those of the non-filler-containing granular PTFE powder, and a possible range of its apparent density is as wide as 0.7 to 1.0 g/cc depending on kind and amount of the filler. In that case, too, according to the shaping of the present invention, an apparent density and powder flowability can be increased without changing an average particle size and particle size distribution. In either case, for example, a change in an average particle size after the shaping is within ±10%, preferably within ±5%, more preferably within ±3%. Also the particle size distribution after the shaping does not change substantially or becomes rather narrower.

As mentioned above, a granulation method of a granular PTFE powder is not limited, and there are, for example, the following methods. Examples thereof are a method of stirring a fine PTFE powder in water at high temperature (cf. JP-B-47-8372), a method of adding a fine PTFE powder to an organic solvent being capable of wetting PTFE to give a slurry and then tumbling with a blender, etc. (cf. JP-B-43-6290, JP-B-44-22620), a method of wetting a fine powder with a water-insoluble organic solvent being capable of wetting PTFE and then stirring in water (cf. JP-B-44-22619), a method of wetting a PTFE powder with an aqueous solution containing a surfactant and then tumbling with a blender, etc. (cf. JP-B-54-17782, WO97/17392), a method of wetting a PTFE powder with an aqueous solution containing a surfactant to give a slurry and then stirring in water in the presence of an organic solvent (cf. WO97/15611), a method of stirring a PTFE powder in water in the presence of an organic solvent being capable of wetting PTFE and a surfactant (cf. WO97/11111), and the like.

The granular PTFE powder used in the present invention is a powder generally called a molding powder, and is prepared by once pulverizing a starting powder obtained by suspension polymerization into a size of several tens of microns to hundreds of microns and then granulating the pulverized powder.

In case of a molding powder, the smaller a particle size is, the more dense a molded article is and the better a surface condition of the molded article is. On the contrary, there are drawbacks from the viewpoint of its handling that a powder flowability is lowered, an apparent density is low and a powder is easily solidified. The granular PTFE powder of the present invention has enhanced handling property though properties of the molded article obtained therefrom are somewhat sacrificed.

Examples of PTFE are tetrafluoroethylene (TFE) homopolymer and copolymers of TFE which are not melt-processable (a content of comonomer is usually up to 5% by weight).

As the monomer copolymerizable with TFE, there are, for example, a perfluoro(vinyl ether) represented by the formula (I):

wherein $R_f$ is a perfluoroalkyl group having 1 to 10 carbon atoms, a perfluoro(alkoxyalkyl) group having 4 to 9 carbon atoms, an organic group represented by the formula (II):

in which m is 0 or an integer of 1 to 4, or an organic group represented by the formula (III):

in which n is an integer of 1 to 4, and the like.

The number of carbon atoms of the above-mentioned perfluoroalkyl group is from 1 to 10, preferably from 1 to 5. When the number of carbon atoms is within the above-mentioned range, an effect of making creep resistance excellent can be obtained with maintaining the property of being not-melt-processable.

As the above-mentioned perfluoroalkyl group, there are, for example, perfluoromethyl, perfluoroethyl, perfluoropropyl, perfluorobutyl, perfluoropentyl, perfluorohexyl and the like. From the viewpoint of creep resistance and cost of monomer, perfluoropropyl is preferable.

When a proportion of the monomer copolymerizable with TFE is within the range of 1.0 to 0.001% by mole, creep resistance of a molded article obtained from the granular powder can be improved.

The granular PTFE powder used in the present invention may contain a filler. Examples of the filler are, for instance, one or more of metal fiber powders or metal powders such as glass fiber powder, graphite powder, bronze powder, gold powder, silver powder, copper powder, stainless steel powder, stainless steel fiber powder, nickel powder and nickel fiber powder; inorganic fiber powders or inorganic powders such as molybdenum disulfide powder, fluorinated mica powder, coke powder, carbon fiber powder, boron nitride powder and carbon black; organic powders such as heat-resistive aromatic resin powder, e.g. polyoxybenzoyl polyester, polyimide powder, tetrafluoroethylene-perfluoro (alkyl vinyl ether) copolymer (PFA) powder and polyphenylene sulfide powder; and the like. The filler is not limited thereto.

In case where two or more fillers are used, preferable combination is, for example, glass fiber powder and graphite powder, glass fiber powder and molybdenum disulfide powder, bronze powder and molybdenum disulfide powder, bronze powder and carbon fiber powder, graphite powder and coke powder, graphite powder and heat-resistive aromatic resin powder, carbon fiber powder and heat-resistive aromatic resin powder or the like. The mixing method may be either of wet method or dry method.

It is preferable that an average particle size or an average fiber length of the above-mentioned filler is from 10 to 500 μm.

With respect to the proportion of the PTFE powder and the filler, it is preferable that the proportion of the filler is from 2.5 to 100 parts (parts by weight, hereinafter the same), more preferably 5 to 80 parts on the basis of 100 parts of the PTFE powder.

The granular PTFE powder obtained by granulating the PTFE powder or the PTFE powder containing a filler by the above-mentioned various granulation methods can be subjected to shaping of the present invention as it is. On the other hand, as mentioned below, the granular PTFE powder may be once deagglomerated and then subjected to shaping with a rotating-type stirring vessel with two cross axes such as a cross rotary mixer. With the deagglomeration step, there is an advantage that the particle size can be made fine.

As the deagglomeration methods, there are a method of deagglomerating with a flash mill (JP-B-44-22620), a method of deagglomerating with a homomixer (JP-B-44-22619), and the like. The deagglomeration method is selected depending on the method of granulation.

Deagglomeration conditions vary depending on a deagglomerating machine to be used, a desired particle size, etc. From the viewpoint of making a particle size proper, it is preferable to select the deagglomeration conditions where an average particle size after the deagglomeration is from 100 to 800 μm, preferably from 300 to 700 μm. In the method of granulating in water, from the viewpoint of productivity, it is preferable that the deagglomeration is carried out, for example, by external circulation from a granulation tank by using a homomixer.

According to the shaping method of the present invention, an apparent density can be increased and a powder flowability can be enhanced without substantially changing an average particle size and particle size distribution of the granular PTFE powder after the shaping step.

EXAMPLE

The shaping method of the present invention is then explained by means of examples, but the present invention is not limited to them.

In the present invention, physical properties were measured by the following methods. Apparent density:

Measured according to JIS K 6891-5.3.
Flowability 1

Measured in accordance with the method described in JP-A-3-259925.

Figure 2:
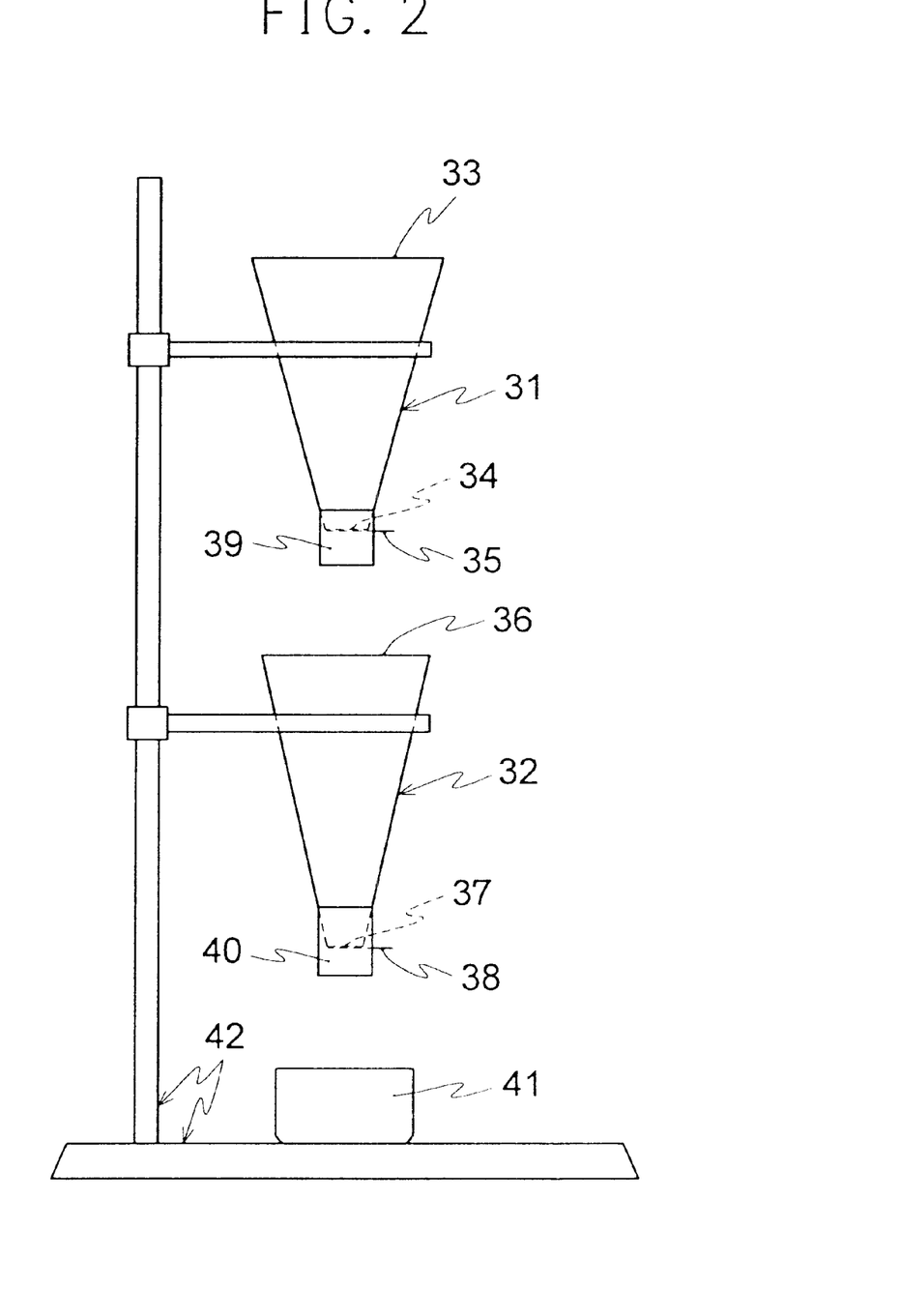
FIG. 2 is a diagrammatic view of an apparatus used for determining a flowability in examples of the present invention.

Namely, there is used a measuring apparatus comprising a support base 42, an upper hopper 31 and a lower hopper 32. The both hoppers are aligned on their center lines and supported on the support base 42 as shown in FIG. 2 (corresponding to FIG. 3 described in JP-A-3-259925). The upper hopper 31 has an inlet 33 of 74 mm diameter, an outlet 34 of 12 mm diameter and a partition plate 35. The height from the inlet 33 to the outlet 34 is 123 mm. The partition plate 35 is provided on the outlet 34, and thereby the powder in the hopper can be kept therein and dropped optionally. The lower hopper 32 has an inlet 36 of 76 mm diameter, an outlet 37 of 12 mm diameter and a partition plate 38. The height from the inlet 36 to the outlet 37 is 120 mm, and the partition plate 38 is provided on the outlet 37 like the upper hopper. The upper hopper and the lower hopper are adjusted so that the distance between the both partition plates is 15 cm. In FIG. 2, numerals 39 and 40 represent outlet covers of each hopper, and numeral 41 represents a vessel for receiving the dropped powder.

Prior to measuring the flowability, about 200 g of powder is allowed to stand for not less than four hours in a room, the temperature of which is adjusted to 23.5° to 24.5° C., and then sieved with a 10 mesh sieve (sieve opening: 1,680 μm). The measurement of the flowability is carried out at the same temperature.

(I) At first, immediately after the upper hopper 31 is charged with just a cup of powder by using a 30 cc cup, the partition plate 35 is pulled out to drop the powder into the lower hopper. When the powder does not drop, the powder is stuck with a wire. After the powder has dropped completely into the lower hopper 32, the dropped powder is allowed to stand for 15±2 seconds, and then the partition plate 38 of the lower hopper is pulled out to see whether or not the powder is dropped from the outlet 37. When the powder is dropped completely within eight seconds, the powder is estimated to have been dropped as required.

(II) The same steps as above are repeated three times to see if the powder is dropped as required. In case where the powder is dropped satisfactorily twice or more, the flowability of the powder is estimated to be "Good". In case where the powder is never dropped, the flowability of the powder is estimated to be "Not good". In case where in three series of the dropping test, the powder has been dropped only one time, the dropping test is further conducted twice, and when the two series of the dropping test are both satisfactory, the flowability is estimated to be "Good". In other cases, the flowability is estimated to be "Not good".

(III) With respect to the powder estimated to be "Good", the upper hopper is charged with two cups of powder by using the same 30 cc cup, and the dropping test of the powder is conducted in the same manner as above. When as a result, the flowability is estimated to be "Good", the number of cups filled with the powder is increased successively and the dropping test is continued until the flowability is estimated to be "Not good". The dropping test is conducted up to eight cups at most. The powder having flowed out from the lower hopper in the previous dropping test may be re-used.

(IV) The larger the amount of the PTFE powder is, the more difficult to drop.

The number of cups when the flowability is estimated to be "Not good" is subtracted by 1, and the obtained value is taken as "Flowability 1" of the powder.

Flowability 2

Flowability 2 is measured and evaluated in the same manner as in Flowability 1 except that the diameter of the outlet of the lower hopper is changed to 8 mm. Average particle size:

Standard sieves of 10, 20, 32, 48 and 60 meshes (inch mesh) are placed in that order from the top, and PTFE powder is put on the 10 mesh sieve. The sieves are vibrated to drop smaller particles downward through each sieve in order. Then after the ratio of the PTFE powder remaining on each sieve is obtained by %, accumulated percentages (ordinate) of each remaining powder to the openings of each sieve (abscissa) are plotted on the logarithmic probability paper, and those points are connected with a line. The particle size, the proportion of which is 50% on that line, is obtained and is regarded as an average particle size.

Particle Size Distribution

The particle size distribution is a proportion in weight of the particles having a diameter 0.7 to 1.3 times the average particle size on the basis of the whole particles, and is calculated by multiplying the average particle size by 0.7 or 1.3. The obtained values are plotted on the accumulated weight percentage curve, and thus the weight percentage is obtained.

Tensile Strength (Hereinafter May be Referred to as "TS") and Elongation (Hereinafter May be Referred to as "EL")

A die having an inner diameter of 100 mm is charged with 25 g of powder, and a pressure is applied gradually over about 30 seconds until the final pressure becomes about 500 kg/cm$^2$. Then that pressure is kept for two minutes to give a pre-molded article. The pre-molded article is taken out of the die mold and put in an electric oven being kept at 365° C. to be subjected to sintering for three hours. Then the sintered article is punched with a JIS dumbbell No. 3 to give a sample. A stress at break and elongation of the sample are measured in accordance with JIS K 6891-5.8 by stretching at a stretching rate of 200 mm/min with an autograph having a gross weight of 500 kg.

EXAMPLE 1

80 Kg (dry basis) of a PTFE powder (POLYFLON TFE MOLDING POWDER M-12 which is PTFE homopolymer available from DAIKIN INDUSTRIES, LTD.) having an average particle size of 31 μm after pulverizing, 15 kg of glass fibers (average diameter: 12 μm, average fiber length: 80 μm) which had been subjected to water-repellent-treatment previously with an aminosilane coupling agent and 5 kg of molybdenum disulfide powder (average particle size: 4 μm) were pre-mixed by using a 500-liter Henschel mixer.

A 150-liter ribbon mixer (available from Fuji Paudal Co., Ltd.) was charged with 40 kg of the mixture comprising PTFE powder, glass fiber and molybdenum disulfide and obtained by the above-mentioned pre-mixing, followed by adding thereto 14 kg of an aqueous solution of 1.25% by weight of ammonium perfluorooctanoate over five minutes under the conditions of a temperature of 30° C. and rotation of 35 rpm. After stirring under the same conditions for 10 minutes, the mixture was passed to a flash mill (available from Fuji Paudal Co., Ltd.) rotating at 850 rpm to give a granular PTFE powder 1 containing glass fibers and molybdenum disulfide. The granular PTFE powder 1 had an average particle size of 640 μm, an apparent density of 0.61 g/cc, a flowability of 0 and a particle size distribution shown in Table 1.

40 Kg of the granular PTFE powder 1 was put in a 130-liter cross rotary mixer with a stirring vessel, and a temperature thereof was maintained at 56° C. by refluxing hot water in its jacket. Then the stirring was carried out for 20 minutes at 20 rpm of autorotation speed and 12 rpm of revolution speed (a ratio of revolution/autorotation: 0.6) for shaping of the granular powder.

Physical properties of the obtained granular PTFE powder after the shaping and physical properties of a molded article obtained from the powder are shown in Table 1.

Comparative Example 1

A 150-liter ribbon mixer (available from Fuji Paudal Co., Ltd.) was charged with 40 kg of the granular PTFE powder 1, and stirring was carried out at 35 rpm at 30° C. for 10 minutes.

Physical properties of the obtained (usual) granular PTFE powder for comparison after the shaping and physical properties of a molded article obtained from the powder are shown in Table 1.

Figure 3:
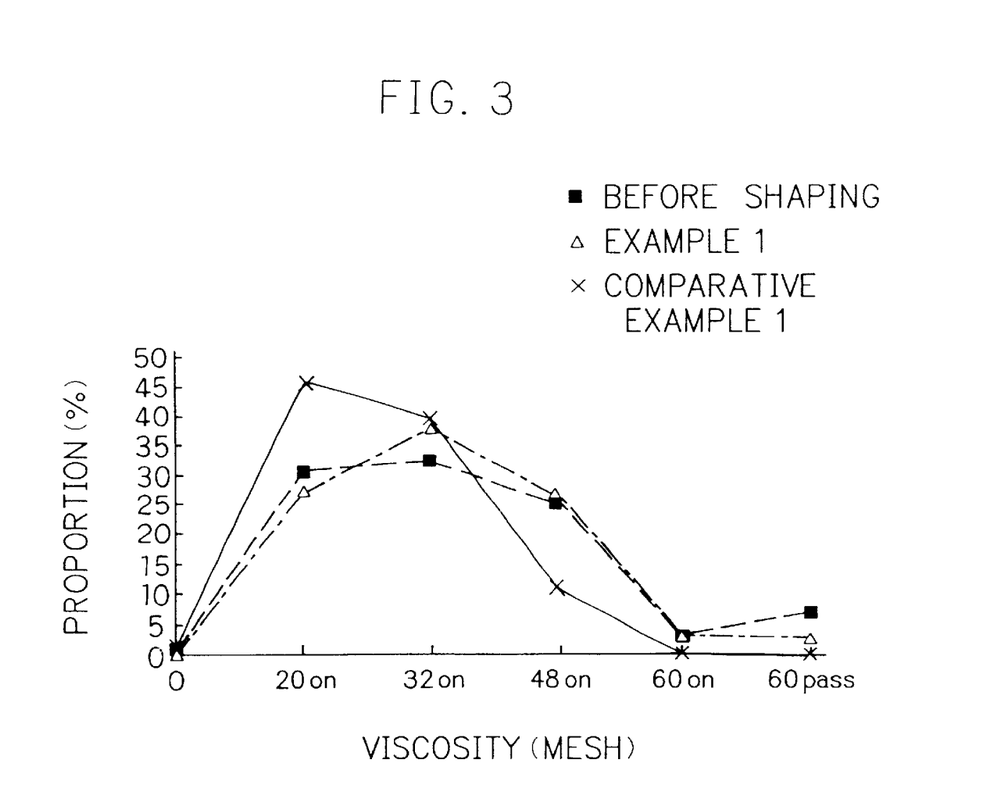
FIG. 3 is a graph showing a particle size distribution of granular PTFE powders subjected to shaping in Example 1 of the present invention and Comparative Example 1 and a starting granular PTFE powder.

Also FIG. 3 shows a particle size distribution of the granular PTFE powder 1 before the shaping, the granular PTFE powder after the shaping which was obtained in Example 1, and the granular PTFE powder after the shaping which was obtained in Comparative Example 1.

TABLE 1

|  | Before shaping | After shaping | |
| --- | --- | --- | --- |
|  |  | Cross rotary mixer (Ex. 1) | Ribbon mixer (Com. Ex. 1) |
| Average particle size (μm) | 640 | 640 | 820 |
| Apparent density (g/cc) | 0.61 | 0.78 | 0.78 |
| Flowability 1 (times) | 0 | 8 | 8 |
| Flowability 2 (times) | 0 | 6 | 2 |
| Particle size distribution (%) |  |  |  |
| 10 mesh on | 1 | 0 | 1.6 |
| 20 mesh on | 30.6 | 27.4 | 46.2 |
| 32 mesh on | 32.6 | 38.2 | 40 |
| 48 mesh on | 25.6 | 26.8 | 11.4 |
| 60 mesh on | 3.6 | 4 | 0.6 |
| 60 mesh pass | 7.4 | 3.6 | 0.2 |
| Physical properties of molded article |  |  |  |
| Tensile strength (kg/cm) | 239 | 236 | 205 |
| Tensile elongation (%) | 330 | 330 | 300 |

In the column of the particle size distribution of Table, 10 mesh on, 20 mesh on, 32 mesh on, 48 mesh on and 60 mesh on indicate the percentages of particles remaining on the 10 mesh, 20 mesh, 32 mesh, 48 mesh and 60 mesh, respectively. And, 60 mesh pass represents the percentage of the particles passed through the 60 mesh sieve.

As is evident from Table 1 and FIG. 3, according to the method of shaping of the present invention, not only an apparent density can be increased but also enhancement of a flowability which is a primary object of shaping of the present invention can be achieved without changing an average particle size and a particle size distribution substantially.

EXAMPLE 2

80 Kg (dry basis) of a PTFE powder (POLYFLON TFE MOLDING POWDER M-12 which is PTFE homopolymer available from DAIKIN INDUSTRIES, LTD.) having an average particle size of 31 μm after pulverizing and 14.1 kg of pitch type carbon fibers (average diameter: 14.5 μm, average fiber length: 90 μm) were pre-mixed by using a 500-liter Henschel mixer.

A 150-liter ribbon mixer (available from Fuji Paudal Co., Ltd.) was charged with 40 kg of the mixture comprising the PTFE powder and pitch type carbon fiber and obtained by the above-mentioned pre-mixing, followed by adding thereto 14 kg of an aqueous solution of 1.25% by weight of ammonium perfluorooctanoate over five minutes under the conditions of a temperature of 30° C. and rotation of 35 rpm.

After stirring under the same conditions for 10 minutes, the mixture was passed to a flash mill (available from Fuji Paudal Co., Ltd.) rotating at 900 rpm to give a granular PTFE powder 2 containing carbon fibers. The granular PTFE powder 2 had an average particle size of 750 μm, an apparent density of 0.58 g/cc, a flowability of 0 and a particle size distribution shown in Table 2.

40 Kg of the granular PTFE powder 2 was put in a 130-liter cross rotary mixer with a stirring vessel, and a temperature thereof was maintained at 58° C. by refluxing hot water in its jacket. Then the stirring was carried out for 20 minutes at 20 rpm of autorotation speed and 6 rpm of revolution speed (a ratio of revolution/autorotation: 0.3) for shaping of the granular powder.

Physical properties of the obtained granular PTFE powder after the shaping and physical properties of a molded article obtained from the powder are shown in Table 2.

Comparative Example 2

A 150-liter ribbon mixer (available from Fuji Paudal Co., Ltd.) was charged with 40 kg of the granular PTFE powder 2, and stirring was carried out at 25 rpm at 30° C. for 20 minutes.

Physical properties of the obtained (usual) granular PTFE powder for comparison after the shaping and physical properties of a molded article obtained from the powder are shown in Table 2.

TABLE 2

|  | Before shaping | After shaping Cross rotary mixer (Ex. 2) | After shaping Ribbon mixer (Com. Ex. 2) |
| --- | --- | --- | --- |
| Average particle size (μm) | 750 | 760 | 820 |
| Apparent density (g/cc) | 0.58 | 0.69 | 0.67 |
| Flowability 1 (times) | 0 | 8 | 6.5 |
| Particle size distribution (%) | | | |
| 10 mesh on | 1 | 0 | 1.4 |
| 20 mesh on | 41 | 42.1 | 45.6 |
| 32 mesh on | 34.4 | 36.8 | 40.4 |
| 48 mesh on | 13.8 | 12.6 | 10.8 |
| 60 mesh on | 2.8 | 3.2 | 0.8 |
| 60 mesh pass | 8.2 | 5.3 | 1 |
| Physical properties of molded article | | | |
| Tensile strength (kg/cm) | 206 | 217 | 202 |
| Tensile elongation (%) | 260 | 270 | 260 |

As it is evident from Table 2, according to the method of shaping of the present invention, not only an apparent density can be increased but also enhancement of a flowability which is a primary object of shaping of the present invention can be achieved without changing an average particle size and a particle size distribution substantially.

EXAMPLE 3

20 Kg (dry basis) of a PTFE powder (POLYFLON TFE MOLDING POWDER M-12 which is PTFE homopolymer available from DAIKIN INDUSTRIES, LTD.) having an average particle size of 31 μm after pulverizing, 1.25 kg of a graphite powder (average particle size: 25 μm) and 3.75 kg of a wholly aromatic polyester resin powder (ECONOL available from Sumitomo Chemical Industries, Ltd., average particle size: 30 μm) were pre-mixed by using a 150-liter Henschel mixer.

A 150-liter ribbon mixer (available from Fuji Paudal Co., Ltd.) was charged with 40 kg of the mixture comprising the PTFE powder, graphite and ECONOL and obtained by the above-mentioned pre-mixing, followed by adding thereto 14 kg of an aqueous solution of 1.25% by weight of ammonium perfluorooctanoate over five minutes at 30° C. at 35 rpm. After stirring under the same conditions for 10 minutes, the mixture was passed to a flash mill (available from Fuji Paudal Co., Ltd.) rotating at 1,100 rpm to give a granular PTFE powder 3 containing graphite and ECONOL. The granular PTFE powder 3 had an average particle size of 710 μm, an apparent density of 0.58 g/cc, a flowability of 0 and a particle size distribution shown in Table 3.

40 Kg of the granular PTFE powder 3 was put in a 130-liter cross rotary mixer with a stirring vessel, and a temperature thereof was maintained at 56° C. by refluxing hot water in its jacket. Then the stirring was carried out for 20 minutes at 20 rpm of autorotation speed and 6 rpm of revolution speed (a ratio of revolution/autorotation: 0.3) for shaping of the granular powder.

Physical properties of the obtained granular PTFE powder after the shaping and physical properties of a molded article obtained from the powder are shown in Table 3.

Comparative Example 3

A 150-liter ribbon mixer (available from Fuji Paudal Co., Ltd.) was charged with 40 kg of the granular PTFE powder 3, and stirring was carried out at 30 rpm at 30° C. for 8 minutes.

Physical properties of the obtained (usual) granular PTFE powder for comparison after the shaping and physical properties of a molded article obtained from the powder are shown in Table 3.

TABLE 3

|  | Before shaping | After shaping Cross rotary mixer (Ex. 3) | After shaping Ribbon mixer (Com. Ex. 3) |
| --- | --- | --- | --- |
| Average particle size (μm) | 710 | 720 | 820 |
| Apparent density (g/cc) | 0.58 | 0.68 | 0.63 |
| Flowability 1 (times) | 0 | 8 | 3.5 |
| Particle size distribution (%) | | | |
| 10 mesh on | 0.4 | 0 | 3.2 |
| 20 mesh on | 36.0 | 39.8 | 44.9 |
| 32 mesh on | 34.8 | 33.2 | 37.9 |
| 48 mesh on | 22.0 | 22 | 10.0 |
| 60 mesh on | 3.6 | 2.8 | 2.0 |
| 60 mesh pass | 3.0 | 2.2 | 0.0 |
| Physical properties of molded article | | | |
| Tensile strength (kg/cm) | 132 | 146 | 137 |
| Tensile elongation (%) | 230 | 240 | 230 |

As it is evident from Table 3, according to the method of shaping of the present invention, not only an apparent density can be increased but also enhancement of a flowability which is a primary object of shaping of the present invention can be achieved without changing an average particle size and a particle size distribution substantially.

EXAMPLE 4

9.9 Kg (dry basis) of a PTFE powder (POLYFLON TFE MOLDING POWDER M-111 which is a modified PTFE prepared by copolymerizing a small amount of perfluoro (propyl vinyl ether) and available from DAIKIN INDUSTRIES, LTD.) having an average particle size of 25 μm after pulverizing and 1.1 kg of pitch type carbon fibers (average diameter: 12 μm, average fiber length: 110 μm) were pre-mixed by using a 75-liter Henschel mixer.

A 200-liter granulation tank was charged with 130 liters of ion-exchanged water and a tank temperature was adjusted to 25° C. Then the granulation tank was charged with 40 kg of the mixture comprising the PTFE powder and pitch type carbon fiber and obtained by the above-mentioned pre-mixing. With stirring at 400 rpm with cone blades, a nonionic surfactant (Unisafe A-LE available from NOF Corporation) was added thereto in an amount of 0.100% by weight, and 2 to 3 minutes after, 25.0 kg of dichloromethane was added thereto. Subsequently the stirring was continued at 400 rpm for five minutes to make dichloromethane compatible with the mixture of the PTFE powder and pitch type carbon fiber. After that, a product in the granulation tank was passed into a line mixer outside the tank to carry out external circulation for 10 minutes. The inside temperature of the tank was heated up to 38° C. over 30 minutes and was maintained at that temperature for 15 minutes to distill off dichloromethane. During that period of time, the number of rotations of cone blades was 400 rpm. After stopping of the stirring, a granulate was separated from water by using a 150 mesh sieve to give a granular PTFE powder 4. The granular PTFE powder 4 had an average particle size of 480 μm, an apparent density of 0.74 g/cc, a flowability of 6 and a particle size distribution shown in Table 4.

40 Kg of the granular PTFE powder 4 was put in a 130-liter cross rotary mixer with a stirring vessel, and a temperature thereof was maintained at 38° C. by refluxing hot water in its jacket. Then the stirring was carried out for 95 minutes at 24 rpm of autorotation speed and 12 rpm of revolution speed (a ratio of revolution/autorotation: 0.5) for shaping of the granular powder.

Figure 4:
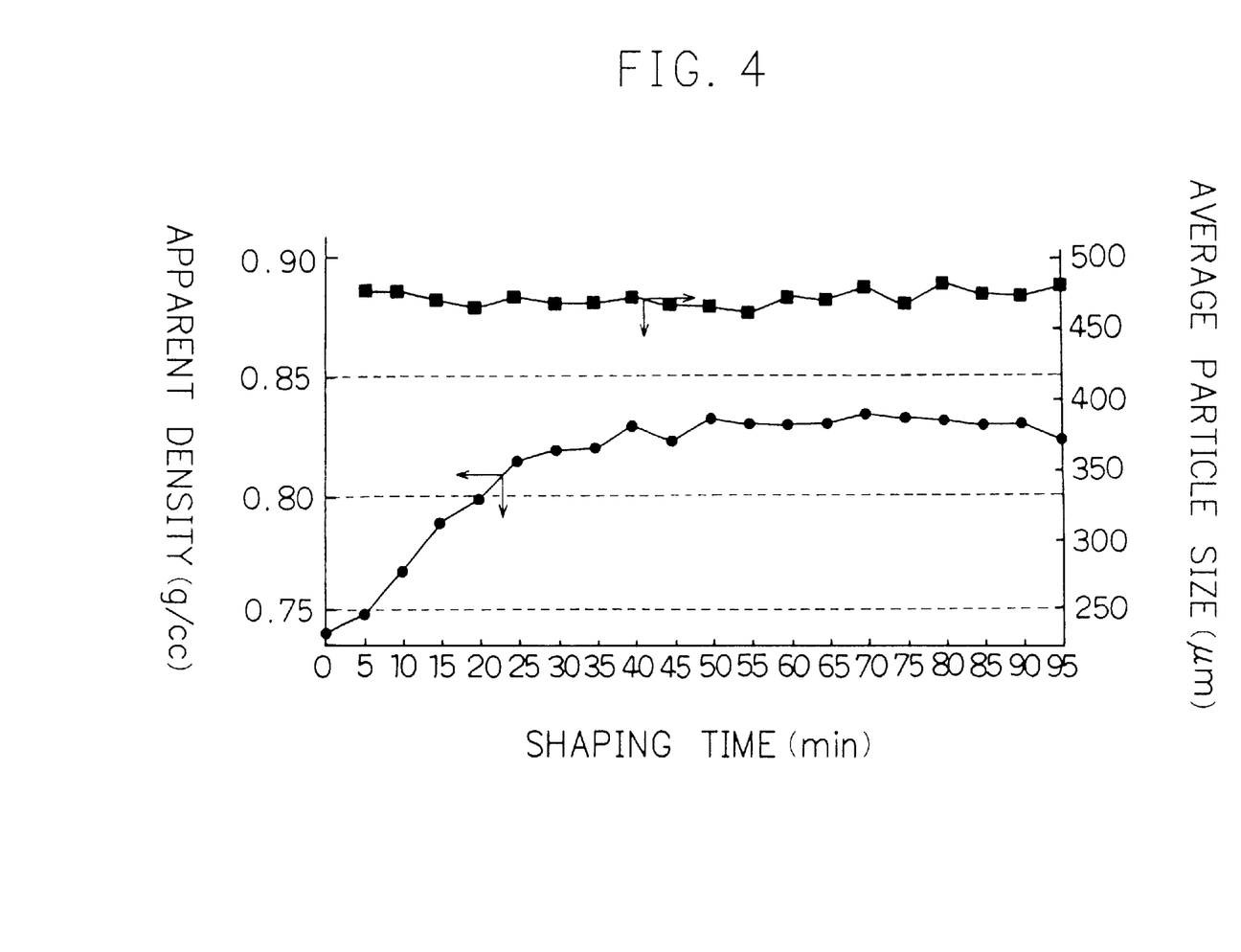
FIG. 4 is a graph showing a relation between a shaping time, apparent density and average particle size in Example 4 of the present invention.

Physical properties of the obtained granular PTFE powder after the shaping are shown in Table 4. Also the powder was sampled every five minutes after starting of the shaping, and an average particle size and particle size distribution were measured. The results are shown in FIG. 4.

TABLE 4

|  | Before shaping | After shaping Cross rotary mixer (Ex. 4) |
|---|---|---|
| Average particle size (μm) | 480 | 480 |
| Apparent density (g/cc) | 0.74 | 0.82 |
| Flowability 1 (times) | 6 | 8 |
| Particle size distribution (%)* |  |  |
| 10 mesh on | 0.0 | 0.0 |
| 20 mesh on | 1.8 | 2.2 |
| 32 mesh on | 42.4 | 43.1 |
| 48 mesh on | 50.4 | 50.1 |
| 60 mesh on | 4.4 | 4.0 |
| 80 mesh on | 0.8 | 0.6 |
| 80 mesh pass | 0.2 | 0.0 |

*A particle size distribution was determined by using a 80 mesh sieve additionally.

As shown in FIG. 4, an apparent density increases rapidly from the starting of the shaping and in about 30 minutes to about 40 minutes, reaches the top. On the contrary, an average particle size does not change substantially throughout the shaping step.

Industrial Applicability

According to the method of shaping of the present invention, not only an apparent density of the granular PTFE powder can be increased but also enhancement of a flowability which is a primary object of shaping of the present invention can be achieved without changing an average particle size and a particle size distribution substantially.

What is claimed is:

1. A method of shaping of a granular polytetrafluoroethylene powder; characterized in that a granular PTFE powder granulated to an average particle size of from 100 to 800 μm is put in a stirring vessel provided with two or more rotation axes crossing each other and is subjected to stirring for shaping by rotating the stirring vessel on its rotation axes.

2. The method of shaping of claim 1, wherein the shaping is carried out under the conditions of increasing an apparent density of the granular polytetrafluoroethylene powder without substantially changing its average particle size and particle size distribution.

3. The method of shaping of claim 2, wherein a ratio of change in an average particle size of the granular polytetrafluoroethylene powder after the shaping is within ±10%.

4. The method of shaping of claim 1, wherein two rotation axes of the stirring vessel are disposed at a right angle to each other.

5. The method of shaping of claim 4, wherein the stirring vessel is a cross rotary mixer.

6. The method of shaping of claim 5, wherein a speed of autorotation of the cross rotary mixer is from 10 to 30 rpm and a speed of revolution thereof is from 5 to 20 rpm.

7. The method of shaping of claim 3, wherein the stirring vessel has two rotation axes disposed at a right angle to each other and the granular polytetrafluoroethylene powder contains a filler.

8. The method of shaping of claim 7, where in the granular polytetrafluoroethylene power is a powder granulated by a dry granulation method.

9. The method of shaping of claim 7, wherein the granular polytetrafluoroethylene power is subjected to a deagglomeration before the shaping.

10. The method of shaping of claim 8, wherein the granular polytetrafluoroethylene power is subjected to deagglomeration before the shaping.

11. The method of shaping of claim 3, wherein the stirring vessel has two rotation axes disposed at a right angle to each other and the granular polytetrafluoroethylene powder does not contain a filler.

12. The method of shaping of claim 11, wherein the granular polytetrafluoroethylene power is a powder granulated by a dry granulation method.

13. The method of shaping of claim 11, wherein the granular polytetrafluoroethylene power is subjected to deagglomeration before the shaping.

14. The method of shaping of claim 12, wherein the granular polytetrafluoroethylene power is subjected to deagglomeration before the shaping.

15. The method of shaping of claim 2, wherein the granular polytetrafluoroethylene power is subjected to deagglomeration before the shaping.

16. The method of shaping of claim 15, wherein the granular polytetrafluoroethylene power is a powder granulated by a dry granulation method.

17. The method of shaping of claim 2, wherein the granular polytetrafluoroethylene power is a power granulated by a dry granulation method.

* * * * *